(12) United States Patent
Lilly, Jr. et al.

(10) Patent No.: US 11,556,666 B2
(45) Date of Patent: Jan. 17, 2023

(54) DATA ACCESS POLICY MANAGEMENT

(71) Applicant: Immuta, Inc., College Park, MD (US)

(72) Inventors: Kyle Thomas Lilly, Jr., Alexandria, VA (US); Eric James Perry, Alexandria, VA (US); Steven William Touw, Rockville, MD (US); Barry Ray Hammen, Severn, MD (US); Adam Carr Hamlin, Hyattsville, MD (US)

(73) Assignee: IMMUTA, INC., College Park, MD (US)

( * ) Notice: Subject to any disclaimer, the term of this patent is extended or adjusted under 35 U.S.C. 154(b) by 385 days.

(21) Appl. No.: 16/654,630

(22) Filed: Oct. 16, 2019

(65) Prior Publication Data

US 2020/0117826 A1  Apr. 16, 2020

Related U.S. Application Data

(60) Provisional application No. 62/746,141, filed on Oct. 16, 2018.

(51) Int. Cl.

| G06F 21/62 | (2013.01) |
|---|---|
| G06F 21/31 | (2013.01) |
| G06F 16/2457 | (2019.01) |
| G06F 16/2455 | (2019.01) |
| G06F 16/2453 | (2019.01) |

(Continued)

(52) U.S. Cl.
CPC .......... *G06F 21/6227* (2013.01); *G06F 16/10* (2019.01); *G06F 16/24* (2019.01); *G06F 16/2455* (2019.01); *G06F 16/2457* (2019.01); *G06F 16/2471* (2019.01);

(Continued)

(58) Field of Classification Search
CPC .......... G06F 16/24539; G06F 21/6227; G06F 21/21; G06F 16/2471; G06F 16/10; G06F 16/2455; G06F 16/2457; H04L 67/1002; H04L 67/1001

See application file for complete search history.

(56) References Cited

U.S. PATENT DOCUMENTS

| 6,064,656 A * | 5/2000 | Angal ................. G06F 21/6218 370/254 |
|---|---|---|
| 2005/0044426 A1* | 2/2005 | Vogel ................. G06F 21/6218 726/19 |

(Continued)

*Primary Examiner* — Alford W Kindred
*Assistant Examiner* — Tiffany Thuy Bui
(74) *Attorney, Agent, or Firm* — MH2 Technology Law Group, LLP

(57) ABSTRACT

A method for automated data access management can include creating a project that manages data access to data sources by a plurality of users, wherein each user has user attributes indicating data access policies for the data sources. The method can also include performing project equalization for the project, wherein the project equalization determines a set of user attributes shared by the users. Additionally, the method can include modifying the user attributes of each user for the project, wherein the user attributes of each user are modified to conform to the set of user attributes determined by the project equalization, and detecting a query to retrieve data from the data source. The method can include modifying the query to produce a modified query by applying the modified user attributes associated with the project to the query and retrieving the data from the data source based on the modified query.

20 Claims, 5 Drawing Sheets

(51) Int. Cl.
*G06F 16/10* (2019.01)
*G06F 16/24* (2019.01)
*G06F 16/2458* (2019.01)
*H04L 67/1001* (2022.01)

(52) U.S. Cl.
CPC ........ *G06F 16/24539* (2019.01); *G06F 21/31* (2013.01); *H04L 67/1001* (2022.05)

(56) References Cited

U.S. PATENT DOCUMENTS

| | | | |
|---|---|---|---|
| 2005/0278334 A1* | 12/2005 | Fey | G06F 21/6218 |
| 2008/0172366 A1* | 7/2008 | Hannel | H04L 63/20 |
| 2009/0094193 A1* | 4/2009 | King | G06F 21/6227 |
| 2013/0091540 A1* | 4/2013 | Chen | H04L 63/0428 |
| | | | 726/1 |
| 2015/0371018 A1* | 12/2015 | Ahmed | G06F 21/6227 |
| | | | 726/17 |
| 2017/0091279 A1* | 3/2017 | Shah | H04L 63/10 |
| 2019/0121879 A1* | 4/2019 | Canelis | G06F 3/04817 |
| 2019/0370358 A1* | 12/2019 | Nation | H04L 9/3247 |
| 2021/0248136 A1* | 8/2021 | Panuganty | G06F 9/4881 |

* cited by examiner

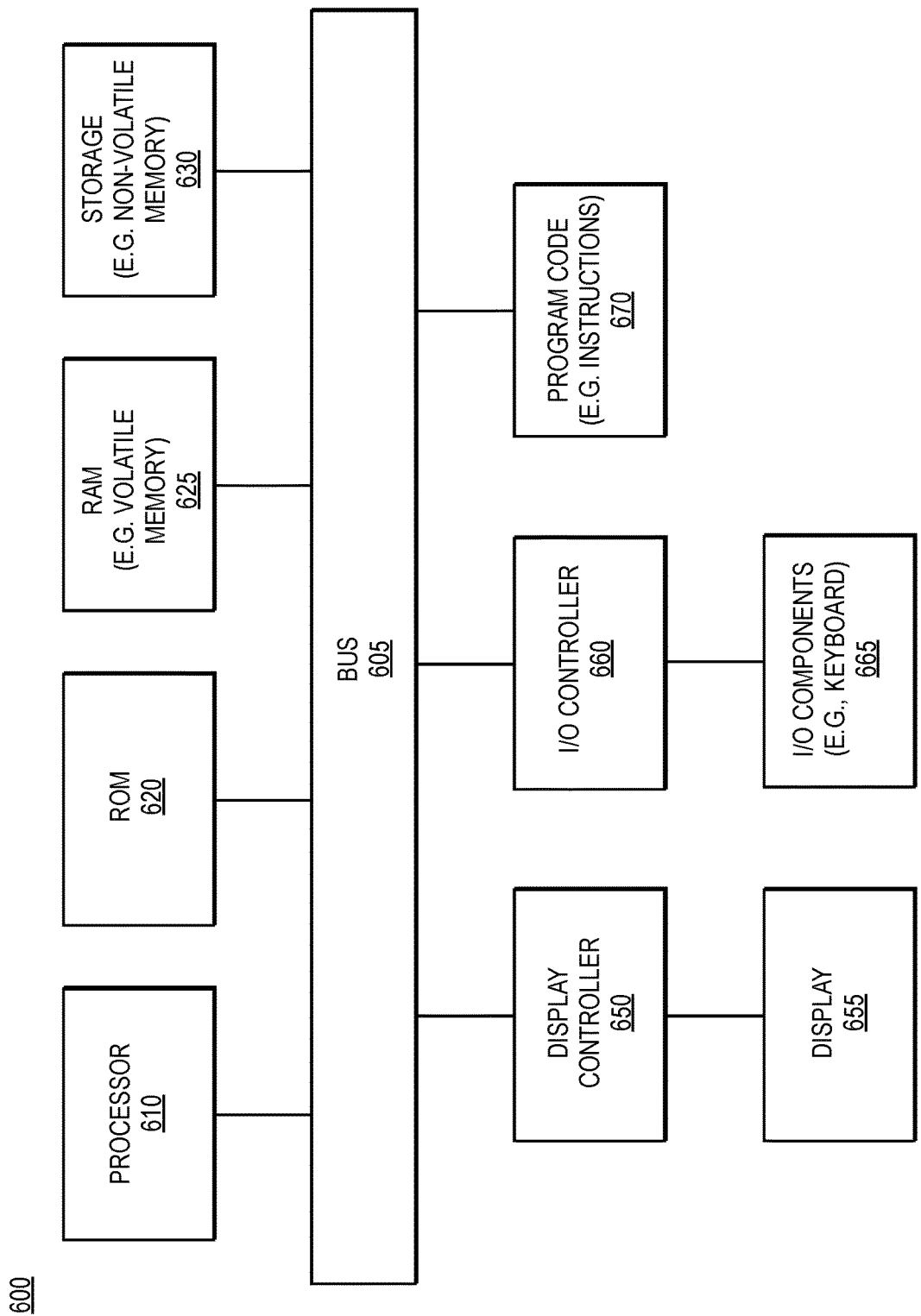

DATA ACCESS POLICY MANAGEMENT

CROSS-REFERENCE TO RELATED APPLICATIONS

This application claims the benefit of U.S. Provisional Patent Application No. 62/746,141 filed on Oct. 16, 2018, the application of which is hereby incorporated by reference in its entirety.

FIELD OF THE DISCLOSURE

The techniques herein generally relate to data access policies, and more particularly, but not exclusively, to methods and systems for determining and applying a shared set of data access policies for users of a project and data derived from projects.

BACKGROUND

Data can be stored in any number of file systems, databases, remote storage devices, and the like. In some examples, data access policies can determine which users can access the data and the actions that the users can perform with the data. In some embodiments, projects can be associated with any number of sources of data, and any number of users. In previous techniques, collaboration between different users of a project can be difficult when the users have different data access policies. Accordingly, a data query executed within a project by different users can return different results. This can cause users to filter the results before sharing the results with other users of the project.

Additionally, using previous techniques, systems cannot implement some data access policies on data, such as, for example, row level security and column masking. In some examples, present techniques also cannot propagate data access policies to new data derived from the original data. The new derived data, post-transformation, may not contain the same data as the original data, but may still require some similarities in data access policy restrictions. Accordingly, present techniques implement manual techniques that require subjective analysis by humans to apply new policies to derived data sources.

Accordingly, techniques herein include new and improved systems and methods for enabling users to access a project with a shared data access policy. Furthermore, techniques herein include new and improved systems, methods and techniques for automatically propagating data access policies for new data created within a project.

SUMMARY

Disclosed herein are systems, methods, and computer program products for automated data access management. In some embodiments, a computer-implemented method for automated data access management can include creating, by a computing device, a project that manages data access to at least one data source by a plurality of users, each of the users among the plurality of users having one or more user attributes indicating data access policies for the at least one data source. The computer-implemented method can also include performing, by the computing device, project equalization for the project, wherein the project equalization determines a set of user attributes shared by the users relevant to the data policies. Additionally, the computer-implemented method can include modifying, by the computing device, the user attributes of each user for the project, wherein the user attributes of each user are modified to conform to the set of user attributes determined by the project equalization. Furthermore, the computer-implemented method can include detecting, by the computing device, a query to retrieve data from the at least one data source and modifying the query to produce a modified query by applying the modified user attributes associated with the project to the query. In addition, the computer-implemented method can include retrieving the data from the at least one data source based on the modified query.

In some examples, the computer-implemented method also includes creating an additional data source that is derived from the at least one data source, the additional data source being associated with the project in response to a request by one of the users. Additionally, in some examples, the project equalization is performed, at least in part, by a policy manager having access to the one or more user attributes, the data access policies, and logic managing the data access policies. In some embodiments, the computer-implemented method can include dynamically enforcing, via the policy manager, at least one of the data access policies on the at least one data source when retrieving the data from the at least one data source based on the modified query. In various implementations, the additional data source can be accessible by additional users that correspond to an additional project and have user attributes that have been modified to conform to the set of user attributes.

In some embodiments, the at least one data source corresponds to a set of database tables comprising at least one row and at least one column. In some examples, the modified query corresponds to a structured query language (SQL) query that is modified by applying the modified user attributes associated with the project. In some examples, the at least one data source corresponds to a set of resources managed by a cluster of devices. In some embodiments, each of the users accesses data from the set of resources via the modified query and retrieving the data from the at least one data source includes retrieving the data from the set of resources based on the modified query. In some examples, the user is prevented from accessing raw data from the set of resources.

In some embodiments, the at least one data source corresponds to data stored in a filesystem and retrieving the data from the at least one data source comprises accessing the data stored in the filesystem based on the modified query. In some examples, accessing the data stored in the filesystem based on the modified query comprises retrieving the data from a cache device when the user attributes of a user executing the query indicate that the user is subscribed to the at least one data source, the user attributes of the user executing the query indicate that the user is associated with the modified user attributes for the project, and the query is executed within a predetermined latency threshold. In some embodiments, accessing the data stored in the filesystem based on the modified query comprises retrieving the data from a remote storage device when the user attributes of a user executing the query indicate that the user is subscribed to the at least one data source, the user attributes of the user executing the query indicate that the user is associated with the modified user attributes for the project, and the data corresponds to a blob data object stored within the remote storage device.

In additional embodiments, a system for automated data access management can include one or more processors, and a memory coupled to the one or more processors, the memory storing instructions, which when executed by the one or more processors, cause the one or more processors to perform operations comprising creating a project that manages data access to at least one data source by a plurality of users, each of the users among the plurality of users having one or more user attributes indicating data access policies for the at least one data source. The operations can also include performing project equalization for the project, wherein the project equalization determines a set of user attributes shared by the users. Additionally, the operations can include modifying the user attributes of each user for the project, wherein the user attributes of each user are modified to conform to the set of user attributes determined by the project equalization. Furthermore, the operations can include detecting a query to retrieve data from the at least one data source and modifying the query to produce a modified query by applying the modified user attributes associated with the project to the query. In addition, the operations can include retrieving the data from the at least one data source based on the modified query.

In yet additional embodiments, a non-transitory computer-readable medium can store instructions which, when executed by one or more processors of a system, cause the system to perform operations comprising creating, by a computing device, a project that manages data access to at least one data source by a plurality of users, each of the users among the plurality of users having one or more user attributes indicating data access policies for the at least one data source. The operations can also include performing, by the computing device, project equalization for the project, wherein the project equalization determines a set of user attributes shared by the users. Furthermore, the operations can include modifying, by the computing device, the user attributes of each user for the project, wherein the user attributes of each user are modified to conform to the set of user attributes determined by the project equalization. In addition, the operations can include detecting, by the computing device, a query to retrieve data from the at least one data source and modifying the query to produce a modified query by applying the modified user attributes associated with the project to the query. Furthermore, the operations can include retrieving the data from the at least one data source based on a modified query.

BRIEF DESCRIPTION OF THE DRAWINGS

The accompanying drawings, which are incorporated into and constitute a part of this specification, illustrate implementations of the techniques herein and together with the description, serve to explain the principles of various embodiments.

FIG. 6 is a block diagram illustrating an example of a computing system that may be used in conjunction with one or more implementations described herein.

DETAILED DESCRIPTION

Figure 1:
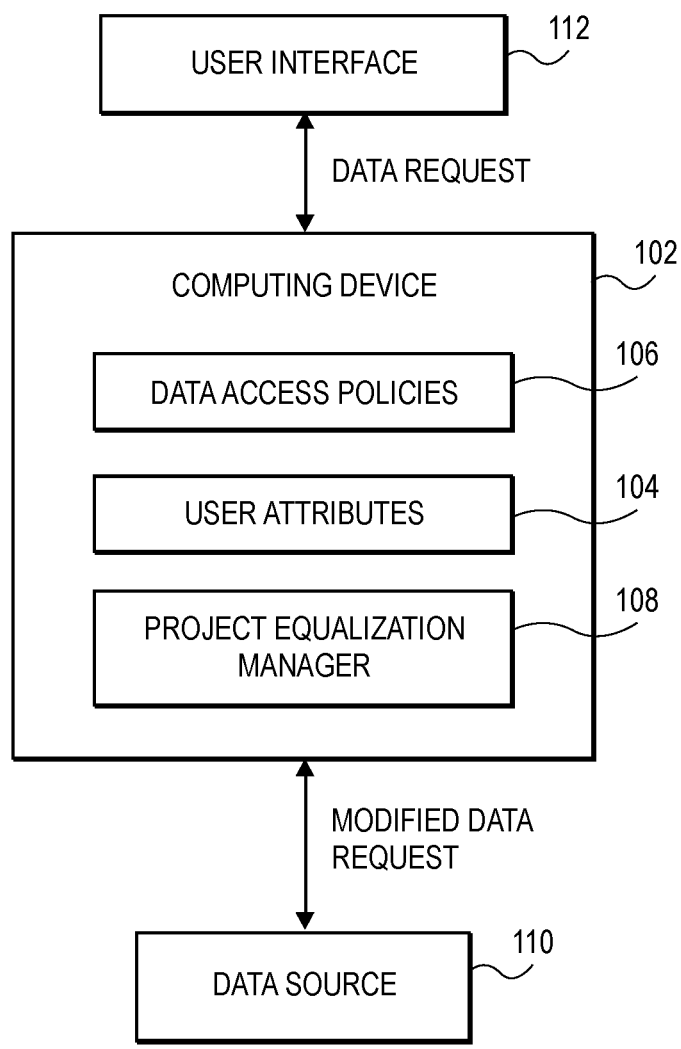
FIG. 1 illustrates an example block diagram for processing a data request based on project equalization techniques, consistent with implementations described herein.

Reference will now be made in detail to example implementations of the techniques herein, examples of which are illustrated in the accompanying drawings. Wherever convenient, the same reference numbers will be used throughout the drawing to refer to the same or like parts.

The techniques herein include improved systems and methods for managing data access within a project with various users and data sources. A project, as referred to herein, can include any number of shared data sources that are accessible by a set of users. For example, a project can include a database table that is accessed by a number of users associated with monitoring or managing the data stored within the database table. As discussed above, previous techniques are limited in terms of the data access policies that can be implemented for a project. The techniques herein can enable users to access a project with a shared data access policy. Furthermore, techniques herein can automatically propagate data access policies for new data shared by any number of users within a project. In some embodiments, the techniques herein enable obtaining data access policies corresponding to a data source and propagating the data access policies to any number of derived data sources in an automated implementation. In some examples, the techniques herein include creating a shared project or workspace. As discussed above, the users of a project may be able to access more or less of the data from a data source of the project depending on each project user's level of access and the policies on the data.

In some embodiments, techniques include automatically propagating data access policies for data sources based on project membership. In some implementations, the data access policies can include, for example, row level security and column masking. In some examples, techniques herein enable propagation of data access policies for data, post-transformation, even in cases where the post-transformation data does not contain the same data as the original data from which the data is derived. In various implementations, techniques herein can automate policy propagation in cases where projects include some similarities in data access policy restrictions between original data and derived data (i.e., data derived from the original data), even when the derived data does not contain the same data as the original data.

In some embodiments, techniques herein include implementing project equalization. Project equalization, as referred to herein, includes dynamically determining and enforcing shared data access policies for users of a project. For example, project equalization can include determining data access policies applicable to the users of a project. The project equalization can also include equalizing data access by each project user so that each user can access the same data from the data sources corresponding to a project. In various implementations, the project equalization is enabled by employing a data management platform or policy manager, which has visibility into the user attributes, the data policies, and the logic behind the data policies. The user attributes, as referred to herein, can indicate the data access policies applicable to each user. In some examples, the data management platform or policy manager can dynamically enforce the project equalization on data of a project at query time. For example, the data management platform or policy manager can detect a query for data from a user of a project and return results for the query based on user attributes obtained by project equalization. In some embodiments, the data management platform or policy manager can enforce the project equalization by dynamically changing the user attributes for each user of a project to match the shared user attributes.

According to some implementations, once a project is equalized, a "waterline" can be established as the set of user attributes any user can be assigned within a project or workspace. For example, the waterline or set of user attributes can include a shared set of user attributes among the users of a project. In some embodiments, the set of user attributes shared by users of a project can be static or can be dynamically modified as the user membership of a project changes.

In some embodiments, the project equalization techniques herein can include limiting data access for projects via a virtual location where both data sources and users can be grouped together. For example, users in a project may be associated with different data access policies and may retrieve different data based on the data access policies prior to project equalization. The techniques herein can enforce shared user attributes for a project so that if the users create any derivative data and share the derivative data with the other users of the project, or even outside of the project, users will not gain access to data outside of the user's assigned data access policies.

FIG. 1 illustrates an example block diagram for processing a data request based on project equalization. In some embodiments, a computing device 102 can include any suitable number of applications, software modules, data repositories, user attributes 104, data access policies 106, and the like. In some embodiments, the computing device 102 can obtain and store any number of data access policies 106. The data access policies 106 can indicate the types of data a user can access within a project, if the accessed data is to be masked, if the accessed data is to be obscured, if a format of the accessed data is to be modified, if the accessed data is to be encrypted, and the like. In some examples, the computing device 102 can also obtain and store user attributes 104 for each user of one or more projects. The user attributes 104 can indicate the data policies to be applied to each user included in a project. For example, the user attributes 104 can indicate if a user is associated with a data policy that masks data, modifies a format of the data, encrypts the data, and the like.

In some embodiments, the computing device 102 can also include a project equalization manager 108 that can determine a shared set of user attributes 104 for each project. For example, the project equalization manager 108 can determine that each user of a project can view a subset of data from a data source 110 without modification. The data source 110 can store data in any suitable format such as a database table, a text or multimedia file format, and the like. In some examples, the project equalization manager 108 can determine that each user can view one or more database tables, a column of data from one or more database tables, a row from one or more database tables, or particular cells from one or more database tables. The project equalization manager 108 can also determine that each user can view files, or a subset of data from files, among others. The project equalization manager 108 can determine a shared set of data from the data source 110 accessible by each user of a project based on the user attributes 104 and the data access policies 106.

In some embodiments, the project equalization manager 108 can detect a data request from a user interface 112. The data request can correspond to a database request, a file request, and the like. The project equalization manager 108 can modify the data request based on the shared set of data accessible by each user of a project. For example, the project equalization manager 108 can generate a modified data request that restricts data access from the data source 110 based on the shared data accessible by all or each of the users of a project. In some embodiments, the project equalization manager 108 can modify the data request to limit the data returned by the data source 110 to the shared data accessible by all or each of the users of the project. Techniques for modifying the data request are described in greater detail below in relation to FIGS. 2-6.

In some embodiments, the project equalization manager 108 can also establish a waterline or a set of user attributes 104 for the project. The project equalization manager 108 can then obtain and create new data for any suitable project based on the set of user attributes. In various implementations, the new derived data can inherit the set of user attributes of a project as a policy and the new derived data can be shared beyond the project with other users that match the inherited set of user attributes without human intervention or subjective analysis.

It is to be understood that the computing device 102 of FIG. 1 is for illustrative purposes only. In some embodiments, the computing device 102 can include additional software, sets of data, and the like. Additionally, in some examples, the computing device 102 can communicate with any number of user interfaces 112 and data sources 110.

Figure 2:
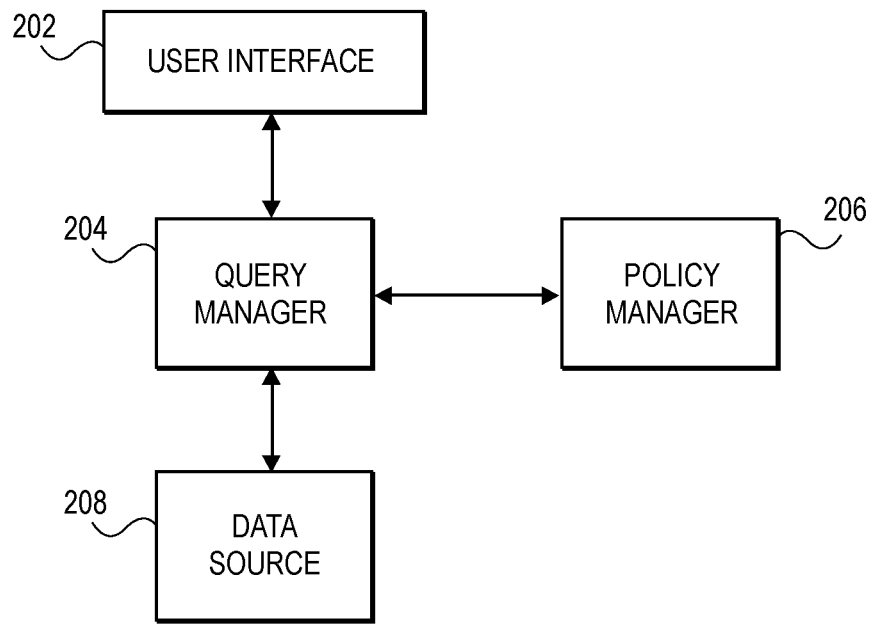
FIG. 2 is an example block diagram illustrating accessing data from a database based on project equalization techniques, consistent with implementations described herein.

FIG. 2 is an example block diagram for accessing data from a database based on project equalization techniques. In some embodiments, a user interface 202 can transmit any suitable database query, such as a structured query language ("SQL") query, among others, to a query manager 204. In some embodiments, the query manager 204 can reside on the computing device 102 of FIG. 1, or any other suitable computing system. The query can request to retrieve data from a data source 208. In some embodiments, a data source 208 corresponds to a set of database tables comprising at least one row and at least one column.

In some examples, the query manager 204 can request data access policy information from a policy manager 206 for each user. For example, the query manager 204 can transmit user credentials, or a user identifier to the policy manager 206. In some embodiments, the policy manager 206 can dynamically enforce data access policies on a data source 208 when executing the query within the project. For example, the policy manager 206 can access local or remote stored user attributes and data policy information corresponding to each user. The policy manager 206 can also implement a project equalization technique that identifies a set of attributes for each user for a project. The project equalization can be performed, at least in part, by the policy manager 206 having access to the one or more user attributes, the data access policies, and logic managing the data access policies. In some embodiments, the set of user attributes for each user can indicate if a user can view unmodified data, if the user is to receive masked data, if the user is to receive row redacted data, if the user is to receive minimized data, if the user is to receive time based restricted data, or if the user is to receive purpose based restricted data, among others. In some examples, the policy manager 206 can apply any shared combination of attributes to each user of a project. For example, the policy manager 206 can determine that each user of a project is to receive data that has a first column that is masked and a particular row that is redacted, or any other suitable combination.

The user attributes shared by users of a project can include any number of different data access policies, such as masking data, row redacting data, and the like. In some examples, masking data can include determining if a column of data in a database table is sensitive. If a column in a data source contains sensitive information, the data in that column may be completely or partially masked or not masked at all depending on a users' authorizations. When SQL query results are returned to users, data in a column with a masking policy applied may be replaced with a constant value, a hash value, or a null value. The masked data results can also contain a number that has been rounded up or down from its original value. Additionally, the masked data results can be partially replaced if the data results contain a match to a regular expression policy. In some examples, unmasked data can include the raw data that is displayed if the user possesses the authorizations specified in the policy.

In some embodiments, row redacted data can result in some rows in a data source not being visible in queries if the data source has row-level policies and the querying user does not possess the necessary authorizations to view that row. For example, a data source with a column titled Group may contain the values A, B or C. The row-level security policy for the data source can establish that a user can access any given row if the value of the Group column in that row matches the name of a project to which the user belongs. If users 1, 2, and 3 run the query "SELECT * FROM" using their user credentials for a database, user 1 may receive all rows from the database if user 1 belongs to groups A, B, and C. In some examples, user 2 may belong only to group A, so the query may return only the rows with the value 'A' in the group column. Additionally, user 3 may not belong to any of the relevant groups. The query by user 3 may fail with an error or not provide any results.

In some embodiments, an additional data access policy can include minimizing data by limiting the amount of data a user can run queries against based on specified percentages and the user's authorizations. For example, a data source may include a number of rows, and a minimization policy can restrict users without a "percentage all" data access policy to retrieving a subset of the rows of data.

In some examples, another data access policy can include time based restriction policies that limit the amount of data a user can query based on a database table row's eventTime identifier and the user's authorizations. For example, a data source can be configured to only return rows that occurred within a predetermined number of minutes, hours, days, weeks, months, and the like based on a data access policy of a user. In some examples, if the user is an administrator, the user can execute queries against all rows of data regardless of the eventTime identifier. If the user is not an administrator, the user can be limited to executing queries against rows whose eventTime occurred in the last predetermined time period. Any data from outside of the time period may not be returned to the user.

In some embodiments, a data access policy can include a purpose based restriction, which restricts usage of the data source to one or more purposes. For example, if a user attempts to execute database queries against a purpose-restricted data source, the user can provide user credentials associated with a project containing that purpose. In some embodiments, the users can access data from a data source that matches the purpose based restrictions. Data that does not match the purpose based restriction corresponding to the user credentials may be inaccessible to the user.

In some examples, data access policies can include a differentially private policy that can restrict users who do not meet the policy conditions to only run a certain type of queries such as aggregate queries. Examples of aggregate queries can include any number of functions such as MIN, MAX, AVG, COUNT, and SUM, among others, and can inject some level of noise or random data values to the aggregate response to protect the privacy of individuals in the data. In some embodiments, the data policies can return differentially private results for broad aggregate queries. Differentially private results can also be cached so that security cannot be circumvented by running the same query multiple times or by multiple users.

In some embodiments, data access policies can restrict a user's access to columns of data of a data source based on any suitable hash function. For example, data access policies can include generating hash values of data values in columns of database tables based on a hash function. In some examples, the hash function can be an irreversible SHA256 hash function, among others, which is consistent for the same value throughout the data source to enable counting or tracking specific values without accessing raw data. In some embodiments, each hash function can be unique for each user, but consistent for that user within a data source. In some examples, a hash value for a first user may not be used or accessible by a second user. In some embodiments, hashed values are different across data sources, which can prevent joining functions based on hashed values. The different hash values can protect against link attacks where two data owners may have exposed data with the same masked column.

In some examples, a data access policy can include replacing data values in columns with null values. In some embodiments, data values in columns of data can also be replaced with constant values, such as "Redacted," a constant numerical value, and the like. In some data access policies, columns of data can be replaced based on regular expressions. For example, a regular expression can mask the final digits of any number, such as an IP address, or any other suitable data values within a column of data.

In some examples, data values in columns of data can be rounded to hide precision from numeric values, while providing more utility than simply generating hash values. For example, rounded data values can remove precision from a geospatial coordinate, dates, and times, among others. In some embodiments, data values in columns of data can be masked with values based on a hash function that is reversible. In some examples, a user can submit an unmasking request to users who meet the exceptions of a data access policy.

In some embodiments, data values in columns of data can also be masked while preserving the length and type of the data values. In some examples, data values can be conditionally masked based on data values in separate columns. For example, a data access policy can include a conditional mask such as "Mask bank account number where country='USA'". The conditional masking can prevent masking entire columns of data.

The policy manager 206 returns data access policy information to the query manager 204 based on a user and a project for which the user requests data. For example, the policy manager 206 can indicate that any combination of the above-referenced data access policies are to be shared and applied to users of a project. The query manager 204 can then modify a query for data from a native or raw data source 208, such as a database, among others. The modified query can return data from the raw data source 208 that is accessible by the users of the project. For example, the modified query can correspond to the shared data access policies for a project based on the project equalization techniques. In some embodiments, the query manager 204 can return the retrieved data from the raw data source 208. The query manager 204, in some examples, can also further modify the retrieved data from the raw data source 208 as described in greater detail below in relation to FIG. 5.

It is to be understood that FIG. 2 is for illustrative purposes only. In some examples, the query manager 204 and policy manager 206 can be implemented by one or more devices. Furthermore, the query manager 204 can retrieve data from any number of raw data sources 208 for one or more projects.

Figure 3:
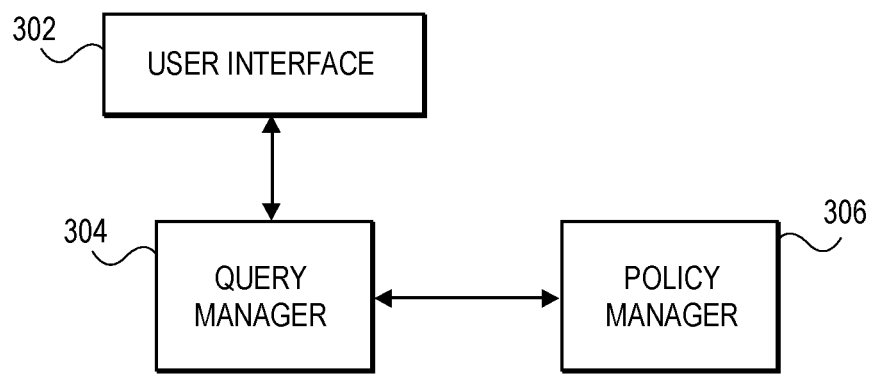
FIG. 3 is an example block diagram illustrating retrieving data from a file system based on project equalization, consistent with implementations described herein.

FIG. 3 is an example block diagram of retrieving data from a file system based on project equalization. In some embodiments, a user who belongs to a project can access project files based on equalized data access policies via a user interface 302. For example, a query manager 304 can detect a request for a file corresponding to a project from a user. In some embodiments, the query manager 304 operates with a file system that can access local files, remote files, and files managed by a distributed computing system, among others. The query manager 304 can determine, via a policy manager 306, if the user can access the file in a file system for the project based on shared user attributes for the project. The shared user attributes for a project can indicate accessible directories, accessible files, read permissions for any number of files, and the like. In some examples, the query can include a virtual namespace that lists only the files that are accessible by the users of a project. In various implementations, the query can also include a native file system path for a requested file corresponding to a project. For example, the query can include a native file system path to a directory that includes a requested file. In some embodiments, the query can return a list of files for a directory corresponding to a project, but the users are restricted to accessing files that are associated with the shared set of user attributes for the project.

In some embodiments, the query manager 304 can enable creating an additional data source that is derived from a data source, wherein the additional data source is associated with the project. For example, the query manager 304 can detect a request by one of the users to create the additional new data source, and the query manager 304 can store new data for the project in the additional new data source. In some examples, access to the additional data source is limited to users for the project or additional users of other projects that have the modified or shared set of user attributes for the project corresponding to the additional data source.

It is to be understood that FIG. 3 is for illustrative purposes only. In some examples, the query manager 304 and the policy manager 306 can be implemented by one or more devices.

Figure 4:
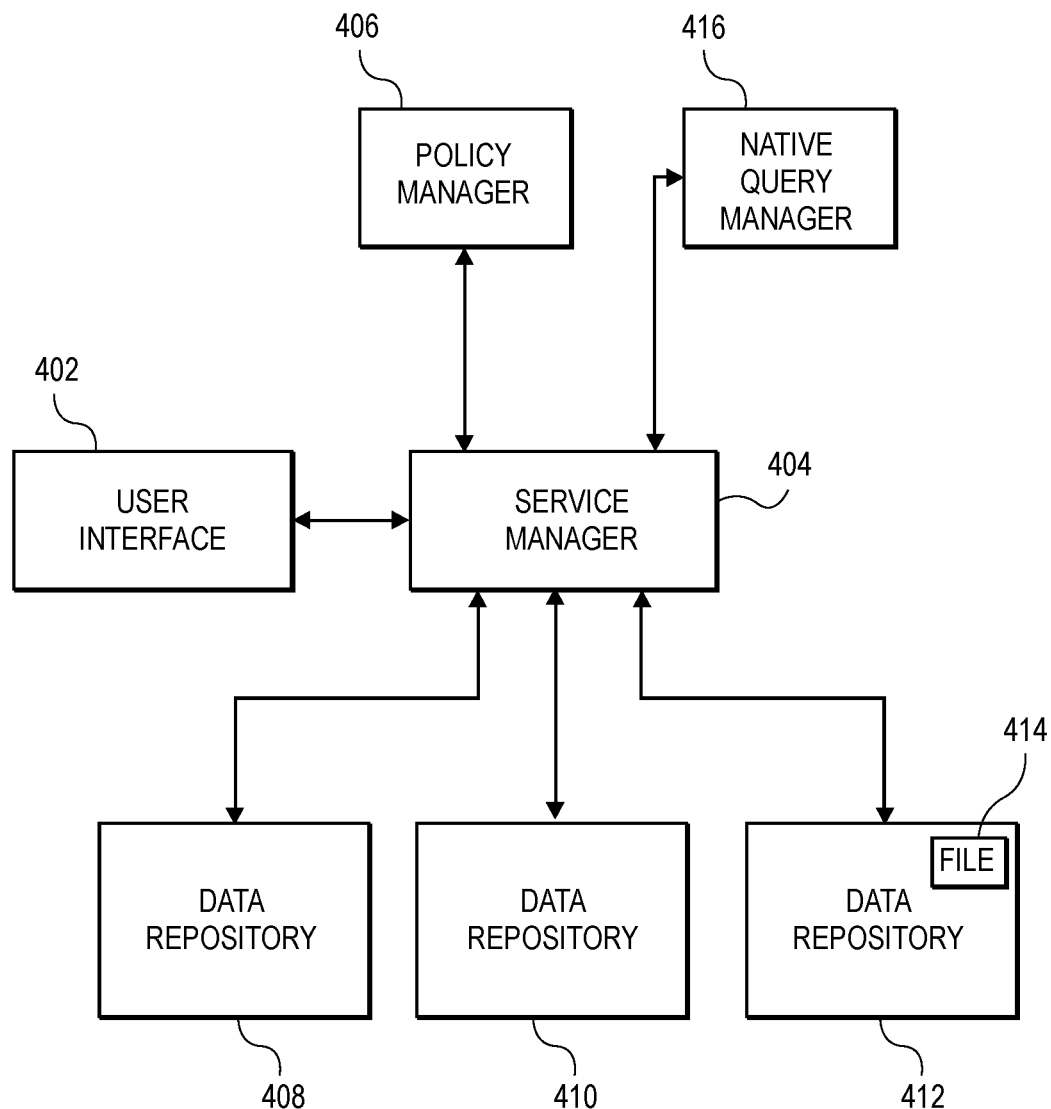
FIG. 4 is an example block diagram illustrating retrieving data from a distributed file system, consistent with implementations described herein.

FIG. 4 is an example block diagram illustrating retrieving data from a distributed file system. In some embodiments, users who belong to a project can access project files based on equalized data access policies via a user interface 402. For example, a service manager 404 can detect a request for a file 414 from a user interface 402. The service manager 404 can determine a user's data access policy based on a shared set of user attributes for a project from a data policy manager 406. The service manager 404 can then query any number of data repositories 408, 410, and 412 to retrieve a file 414 for a project from a user. The service manager 404 can then return the requested file 414 to the user interface 402.

In some embodiments, the data repositories 408, 410, and 412 can be a set of resources managed by a cluster of devices. In some examples, each of the users of a project accesses data from the set of resources via a modified query, wherein the modified query retrieves the data from the set of resources, such as data repositories 408, 410, and 412, based on the modified user attributes associated with the project. In some embodiments, the user is prevented from accessing raw data from the set of resources. For example, the service manager 404 can retrieve and return requested data from the data repositories 408, 410, and 412. In some embodiments, the service manager 404 can return a subset of data in a file, a subset of the files included in a directory, and the like, based on the shared user attributes of a project.

In some embodiments, the data policy manager 406 can access metastore-backed data sources in order to retrieve the data from the underlying files stored in a clustered or distributed system. The metastore can include metadata for tables, such as the schema and location of each table in storage. In some embodiments, the metastore can also include partition metadata that determines the locations of various data sets distributed within a clustered computing system. In some examples, the data policy manager 406 can enable the service manager 404 to access files 414 directly from a native query manager 416 of a clustered or distributed computing system. In some embodiments, the files 414 can include nested data structures stored in a flat columnar format, or data stored with a row-oriented technique, among others.

In some examples, a query that is not supported by an underlying distributed or clustered file system can be executed via any suitable application programming interface, such as Java Database Connectivity (JDBC), among others. In some examples, the query can include partition information that distributes the query to a native query manager 416 of the clustered system.

In some embodiments, the service manager 404 can retrieve the data from a remote storage device in response to the query when a user executing the query is subscribed to the at least one data source, the user executing the query is associated with the modified user attributes for the project, and the data to return for the query corresponds to a binary large object ("blob") data object stored within the remote storage device. A blob data object, as referred to herein, can include any suitable unformatted or binary data stored as a single entity in a database. A blob data object can include images, audio, multimedia objects, and executable files, among others.

In some embodiments, users can generate and share derivative data sets within a project. The derivative data sets can include any suitable data based on the set of shared user attributes for a project. For example, the derivative data sets can include a database table with retrieved masked data, redacted data, and the like, from a data source that is accessible by users of a project. In some examples, users of the project can transmit derived data sets and tables to users outside of the project. For example, the users can transmit derived data sets to users with at least the user attributes of a project.

It is to be understood that FIG. 4 is for illustrative purposes only. In some examples, the service manager 404 and data policy manager 406 can be implemented by one or more devices. Furthermore, the service manager 404 and the data policy manager 406 may execute additional instructions. For example, the service manager 404 may enable context switching between projects. In some embodiments, data access policies of a user can be modified based on a project that a user is accessing. For example, the user can have additional user attributes in a first project and fewer user attributes in a second project.

Figure 5:
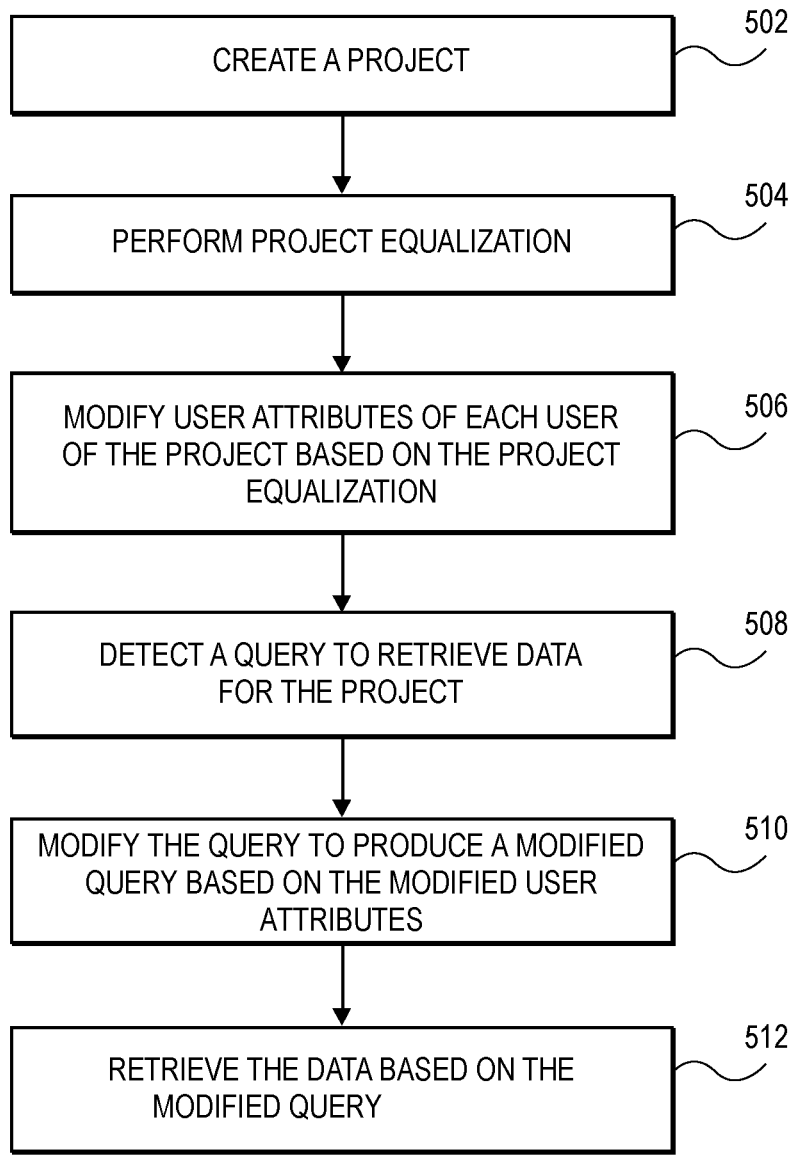
FIG. 5 is an example process flow diagram of a method for retrieving data based on project equalization techniques, consistent with implementations described herein.

FIG. 5 is an example process flow diagram of a method for retrieving data based on project equalization. In some embodiments, the method 500 can be implemented with any suitable computing device such as computing system 102 of FIG. 1, or computing system 600 of FIG. 6, among others.

At block 502, the method can include creating, by a computing device, a project that manages access to one or more data sources by a plurality of users. As discussed above in relation to FIGS. 1-4, the data sources can include databases, file systems, and distributed file systems, among others. In some examples, the data sources can include any combination of databases, file systems, and distributed file systems. For example, a project may include data from one or more databases and one or more file systems or distributed file systems. In some embodiments, the project is created based on input obtained from a user interface. For example, any suitable web-based interface, software application, and the like, can detect queries from a set of users corresponding to a set of data sources to be included in a project.

In some examples, each of the users can be associated with one or more user attributes indicating data access policies for the data sources. As discussed above, the user attributes can indicate if a user can access data from a data source or if the data is to be modified before returning the data to the user. In some examples, the user can be limited, based on user attributes, to accessing data that is masked, row redacted, time based restricted, purpose based restricted, or restricted based on minimized data policies, among others. In some examples, the users can share nothing and all of the user attributes are removed, which results in more restrictive data access policies.

At block 504, the method can include performing, by the computing device, project equalization, wherein the project equalization determines a set of user attributes shared by the users relevant to the data policies. In some embodiments, the project equalization can include equalizing the data access policies of the users to one data access policy or a shared set of data access policies. In some examples, data access policies can be associated with multiple tables or files from different databases or data sources. The data access policies can be implemented at read time by rewriting queries or data requests, either through a database proxy layer, such as a database referencing foreign tables, or natively in any suitable file system, distributed file system, and the like.

In some examples, data access policies can include subscription policies or any suitable policy that grants a user access to data. A subscription policy can be generated when a user exposes a data source, such as a database table or file, among others, as a derived data source. In some examples, a system can generate the subscription policy based on the set of user attributes determined by the project equalization. For example, the subscription policy can be a restriction that represents what the users are privileged to access in a project. If columns A and B are masked with a hash value because Group Z did not meet the shared set of user attributes, but columns C and D were unmasked because Group Y was associated with a shared set of user attributes, the subscription policy on the derivative data source may be inherited such that only users of Group Y can join the table since that was the privilege that existed at the time of creation of the derivative data source.

In some examples, performing project equalization can involve multiple users within a project. For example, a first user of a project may have user attributes A, B, C, and D. The user attributes A, B, C, and D may include one or more user attributes that correlate to access levels for data objects, such as, for example database objects (e.g., tables, materialized views, logical views, rows, and columns). In certain implementations, the user attributes can correspond to data access authorizations, privileges, or permissions, such as, for example, table level, column, cell, or row level authorizations, privileges, or permissions.

In some examples, a second user can have attributes B and D. The first user and the second user can be included in a project with project equalization used to identify data access policies. For example, the first and second users can be assigned user attributes B and D, where B and D are determined automatically by the project equalization techniques described herein. As a result, the first user of the project is prevented from viewing data based on user attributes A and C. In some embodiments, both the first user and the second user can collaborate on some sensitive data that is dynamically protected down to the B and D user attribute level. In some examples, data created within the project can be accessible by additional users that also have user attributes B and D.

At block 506, the method can include modifying, by the computing device, the user attributes of each user for the project. In some embodiments, the user attributes of each user are modified to conform to the set of user attributes determined by the project equalization. For example, one user of a project may have additional user attributes that enable the user to view or access additional data from data sources corresponding to the project. The modified set of user attributes may prevent the user from accessing the additional data, so that each of the users of the project accesses and retrieves the same data when executing queries for a project.

At block 508, the method can include detecting, by the computing device, a query to retrieve data from the at least one data source. The query can request data stored in a cell, row, or column of a database table, data stored in a file of a file system, or data stored across multiple storage devices of a distributed file system, among others.

At block 510, the method can include modifying the query to produce a modified query by applying the modified user attributes associated with the project to the query. In some embodiments, the modified query includes a modification to the query that applies the modified user attributes associated with the project. For example, the modified query can retrieve only the data accessible by the users of a project based on the shared user attributes of the project. The modified query can be generated by modifying SQL code of the original query, or modifying a file search for a file system or distributed file system, among others. For example, a select * query can be modified or converted to select * where country="US". In some examples, for masking, select a, b can be modified to select null as a, b to completely null out column "a" from the requesting user.

At block 512, the method can include retrieving the data from the at least one data source based on a modified query. For example, the retrieved data can be returned to a user interface that initiated the query. In some embodiments, the retrieved data can be further modified before returning the data to the user. For example, the method can include modifying data retrieved from a data source to implement a data access policy when the query is using a function that the native underlying data source, such as a database, does not support. In this example, the method can transmit portions of the query that the data source does support and complete the processing in a query manager.

In some embodiments, the retrieved data can be modified if an anonymization function is not available by a data source. For example, a data source that is a database may not support an anonymization function as a database function. In some examples, a query manager can implement the anonymization function if a data access policy implements a format preserving encryption algorithm on data to hide the true values of the data.

The method 500 of FIG. 5 can include any number of fewer or additional blocks. For example, the method 500 can also include detecting additional data sources to be added to a project. The method 500 can include recognizing and implementing the modified set of user attributes determined by the project equalization. In some examples, a user can also be added to a project based on the modified set of user attributes determined by the project equalization. For example, a new user can result in a modification of data access policies applied to each of the users of a project if the new users have fewer user attributes. In some examples, the new users can be added to a project if the new users have at least the user attributes equal to the modified set of user attributes determined by the project equalization.

In some embodiments, the method can also include creating new data for any suitable project based on the modified set of user attributes. In various implementations, the new derived data can inherit the set of user attributes of a project as a policy and the new derived data can be shared beyond the project with other users that match the inherited set of user attributes without human intervention or subjective analysis.

FIG. 6 shows a block diagram of an example of a computing system 600 that may be used in conjunction with one or more implementations. For example, computing system 600 (or system, or server, or computing device, or device) may represent any of the devices or systems described herein that perform any of the processes, operations, or methods of the disclosure (e.g., the method 500 shown in FIG. 5). In some implementations, the computing system 600 can host the policy manager described above. Note that while the computing system 600 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 600 may include a bus 605 which may be coupled to a processor 610, ROM (Read Only Memory) 620, RAM (or volatile memory) 625, and storage (or non-volatile memory) 630. The processor 610 may retrieve stored instructions from one or more of the memories 620, 625, and 630 and execute the instructions to perform processes, operations, or methods described herein. These memories represent examples of a non-transitory computer-readable medium (or machine-readable medium, or storage) containing instructions which when executed by a processor (or system, or computing system), cause the processor to perform operations, processes, or methods described herein. The RAM 625 may be implemented as, for example, dynamic RAM (DRAM), or other types of memory that require power continually in order to refresh or maintain the data in the memory. Storage 630 may include, for example, magnetic, semiconductor, tape, optical, removable, non-removable, and other types of storage that maintain data even after power is removed from the system. It should be appreciated that storage 630 may be remote from the system (e.g., accessible via a network).

A display controller 650 may be coupled to the bus 605 in order to receive display data to be displayed on a display device 655, which can display any one of the user interface features or implementations described herein and may be a local or a remote display device. The computing system 600 may also include one or more input/output (I/O) components 665 including mice, keyboards, touch screen, network interfaces, printers, speakers, and other devices. Typically, the input/output components 665 are coupled to the system through an input/output controller 660.

Program code 670 (or modules, instructions, components, subsystems, units, functions, or logic) may represent any of the instructions, operations, subsystems, or engines described above. Program code 670 may reside, completely or at least partially, within the memories described above (e.g., non-transitory computer-readable media), or within a processor during execution thereof by the computing system. In addition, program code 670 can be implemented as software, firmware, or functional circuitry within the computing system, or as combinations thereof. In some implementations, program code 670 can be located in a functional form on computer-readable media (e.g., one or more of the memories 620, 625, and 630) that is selectively removable and can be loaded onto or transferred to the computing system 600 for execution by the processor 610. The program code 670 and computer-readable media can form a computer program product in these illustrative examples.

Moreover, any of the disclosed implementations may be embodied in various types of hardware, software, firmware, and combinations thereof. For example, some techniques disclosed herein may be implemented, at least in part, by non-transitory computer-readable media that include program instructions, state information, etc., for performing various methods and operations described herein. Examples of program instructions include both machine code, such as produced by a compiler, and files containing higher-level or intermediate code that may be executed by a computing device such as a server or other data processing apparatus (or machine) using an interpreter.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other implementations of the techniques herein will be apparent to those skilled in the art from consideration of the specification and practice of the embodiments disclosed herein. It is intended that the specification and various embodiments be considered as examples only.

What is claimed is:

1. A computer-implemented method for automated data access management, the method comprising:

creating, by a computing device, a project that manages data access to at least one data source by a plurality of users, each of the users among the plurality of users having one or more data access policies for the at least one data source;

performing, by the computing device, project equalization for the project, wherein the project equalization determines a shared data access policy to be used by each of the users on the project, wherein the shared data access policy is determined based on the data access policies of all of the plurality of users on the project;

modifying, by the computing device, the one or more data access policies of each of the users for the project, wherein the one or more data access policies of each of the users are modified to conform to the shared data access policy determined by the project equalization;

detecting, by the computing device, a query to retrieve data from the at least one data source;

modifying the query, by the computing device, to produce a modified query by applying the shared data access policy associated with the project to the query; and retrieving the data from the at least one data source based on the modified query.

2. The computer-implemented method of claim 1, further comprising creating an additional data source that is derived from the at least one data source, the additional data source being associated with the project in response to a request by one of the users.

3. The computer-implemented method of claim 1, wherein the project equalization is performed, at least in part, by a policy manager having access to the one or more data access policies, and logic managing the data access policies.

4. The computer-implemented method of claim 3, further comprising dynamically enforcing, via the policy manager, at least one of the one or more data access policies on the at least one data source when retrieving the data from the at least one data source based on the modified query.

5. The computer-implemented method of claim 2, wherein the additional data source is accessible by additional users that correspond to an additional project and have data access policies that have been modified to conform to the shared data access policy.

6. The computer-implemented method of claim 1, wherein the at least one data source corresponds to a set of database tables comprising at least one row and at least one column.

7. The computer-implemented method of claim 6, wherein the modified query corresponds to a structured query language (SQL) query that is modified by applying the shared data access policy associated with the project.

8. The computer-implemented method of claim 1, wherein the at least one data source corresponds to a set of resources managed by a cluster of devices.

9. The computer-implemented method of claim 8, wherein each of the users accesses data from the set of resources via the modified query; and
wherein retrieving the data from the at least one data source comprises retrieving the data from the set of resources based on the modified query.

10. The computer-implemented method of claim 9, wherein one of the users is prevented from accessing raw data from the set of resources.

11. The computer-implemented method of claim 1, wherein the at least one data source corresponds to data stored in a filesystem; and
wherein retrieving the data from the at least one data source comprises accessing the data stored in the filesystem based on the modified query.

12. The computer-implemented method of claim 11, wherein accessing the data stored in the filesystem based on the modified query comprises retrieving the data from a cache device when:
the one or more data access policies of a user executing the query indicate that the user is subscribed to the at least one data source,
the one or more data access policies of the user executing the query indicate that the user is associated with the shared data access policy for the project, and the query is executed within a predetermined latency threshold.

13. The computer-implemented method of claim 11, wherein accessing the data stored in the filesystem based on the modified query comprises retrieving the data from a remote storage device when:
the one or more data access policies of a user executing the query indicate that the user is subscribed to the at least one data source,
the one or more data access policies of the user executing the query indicate that the user is associated with the shared data access policy for the project, and
the data corresponds to a blob data object stored within the remote storage device.

14. A system for automated data access management, the system comprising:
one or more processors; and
a memory coupled to the one or more processors, the memory storing instructions, which when executed by the one or more processors, cause the one or more processors to perform operations comprising:
creating a project that manages data access to at least one data source by a plurality of users, each of the users among the plurality of users having one or more data access policies for the at least one data source;
performing project equalization for the project, wherein the project equalization determines a shared data access policy to be used by each of the users on the project, wherein the shared data access policy is determined based on the data access policies of the users, wherein the shared data access policy is determined based on the data access policies of all of the plurality of users on the project;
modifying the one or more data access policies of each user for the project, wherein the one or more data access policies of each user are modified to conform to the shared data access policy determined by the project equalization;
detecting a query to retrieve data from the at least one data source;
modifying the query to produce a modified query by applying the shared data access policy associated with the project to the query; and
retrieving the data from the at least one data source based on the modified query.

15. The system of claim 14, wherein the operations further comprise creating an additional data source that is derived from the at least one data source, the additional data source being associated with the project in response to a request by one of the users.

16. The system of claim 14, wherein the project equalization is performed, at least in part, by a policy manager having access to the one or more data access policies, and logic managing the data access policies.

17. The system of claim 16, wherein the operations further comprise dynamically enforcing, via the policy manager, at least one of the one or more data access policies on the at least one data source when retrieving the data from the at least one data source based on the modified query.

18. The system of claim 15, wherein the additional data source is accessible by additional users that correspond to an additional project and have data access policies that have been modified to conform to the shared data access policy.

19. The system of claim 14, wherein the at least one data source corresponds to a set of database tables comprising at least one row and at least one column.

20. A non-transitory computer-readable medium storing instructions which, when executed by one or more processors of a system, cause the system to perform operations comprising:
- creating, by a computing device, a project that manages data access to at least one data source by a plurality of users, each of the users among the plurality of users having one or more data access policies for the at least one data source;
- performing, by the computing device, project equalization for the project, wherein the project equalization determines a shared data access policy for each of the users on the project, wherein the shared data access policy is determined based on the data access policies of all of the plurality of users on the project;
- modifying, by the computing device, the one or more data access policies of each user for the project, wherein the one or more data access policies of each user are modified to conform to the shared data access policy determined by the project equalization;
- detecting, by the computing device, a query to retrieve data from the at least one data source;
- modifying the query to produce a modified query by applying the shared data access policy associated with the project to the query; and
- retrieving the data from the at least one data source based on a modified query.

\* \* \* \* \*